US010057116B2

(12) United States Patent
Qu et al.

(10) Patent No.: US 10,057,116 B2
(45) Date of Patent: Aug. 21, 2018

(54) METHOD AND DEVICE FOR CONFIGURING AND MANAGING NETWORK ELEMENT EQUIPMENT, AND NETWORK ELEMENT EQUIPMENT

(71) Applicant: ZTE Corporation, Shenzhen (CN)

(72) Inventors: Yanfeng Qu, Shenzhen (CN); Guoman Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 103 days.

(21) Appl. No.: 15/030,296

(22) PCT Filed: Jun. 16, 2014

(86) PCT No.: PCT/CN2014/079994
§ 371 (c)(1),
(2) Date: Apr. 18, 2016

(87) PCT Pub. No.: WO2015/055016
PCT Pub. Date: Apr. 23, 2015

(65) Prior Publication Data
US 2016/0277239 A1    Sep. 22, 2016

(30) Foreign Application Priority Data

Oct. 17, 2013    (CN) .......................... 2013 1 0487729

(51) Int. Cl.
*H04L 12/28*    (2006.01)
*H04L 12/24*    (2006.01)
(Continued)

(52) U.S. Cl.
CPC .......... *H04L 41/0806* (2013.01); *H04L 41/08* (2013.01); *H04L 41/0886* (2013.01);
(Continued)

(58) Field of Classification Search
CPC . H04L 41/0806; H04L 41/08; H04L 41/0886; H04L 41/12; H04L 41/0853;
(Continued)

(56) References Cited

U.S. PATENT DOCUMENTS 9,654,418 B2 *   5/2017   Saltsidis .............. H04L 47/827
2004/0013120 A1 *   1/2004   Shen .................... H04L 12/4679
370/395.31

(Continued)

FOREIGN PATENT DOCUMENTS

CN    101390321 A    3/2009
CN    102171999 A    8/2011
(Continued)

OTHER PUBLICATIONS

International Search Report dated Aug. 29, 2014 re: Application No. PCT/CN2014/079994; pp. 1-2; citing: CN 102780569 A, CN 102171999 A, CN 101390321 A, CN 102684915 A and US 2012236761 A1.
(Continued)

*Primary Examiner* — Kevin Mew
(74) *Attorney, Agent, or Firm* — Cantor Colburn LLP

(57) ABSTRACT

Provided are a method and device for configuring and managing network element equipment, and network element equipment. The method includes that: a management IP address is generated according to network element parameter information; an IGP is started, and a network management VRF and at least one P2P type port is created; the management IP address of an adjacent network element and an a MAC address of the adjacent network element are learned; and network element equipment configuration and management information issued by a network management system is received.

15 Claims, 12 Drawing Sheets

(51) Int. Cl.
*H04L 29/08* (2006.01)
*H04L 12/713* (2013.01)
*H04L 29/12* (2006.01)

(52) U.S. Cl.
CPC .............. *H04L 41/12* (2013.01); *H04L 45/586* (2013.01); *H04L 61/2007* (2013.01); *H04L 61/251* (2013.01); *H04L 61/6022* (2013.01); *H04L 67/16* (2013.01); *H04L 41/0853* (2013.01); *Y02D 30/30* (2018.01)

(58) Field of Classification Search
CPC . H04L 45/586; H04L 61/2007; H04L 61/251; H04L 61/6022; H04L 67/16; Y02B 60/43
See application file for complete search history.

(56) References Cited

U.S. PATENT DOCUMENTS

| | | | |
|---|---|---|---|
| 2005/0174998 A1 | 8/2005 | Vesterinen et al. | |
| 2005/0282523 A1 | 12/2005 | Yoshihara et al. | |
| 2008/0313450 A1* | 12/2008 | Rosenberg | G06F 9/4416 713/2 |
| 2009/0116404 A1 | 5/2009 | Mahop et al. | |
| 2011/0019588 A1* | 1/2011 | Boucadair | H04L 29/12377 370/254 |
| 2012/0236761 A1 | 9/2012 | Yang et al. | |
| 2013/0054789 A1* | 2/2013 | Bajamahal | H04L 41/0873 709/224 |
| 2014/0149819 A1* | 5/2014 | Lu | H04L 45/021 714/748 |
| 2014/0313932 A1* | 10/2014 | Saltsidis | H04L 45/46 370/254 |
| 2014/0369186 A1* | 12/2014 | Ernstrom | H04L 41/0668 370/228 |
| 2015/0124837 A1* | 5/2015 | Saltsidis | H04L 47/827 370/419 |
| 2015/0207671 A1* | 7/2015 | Farkas | H04L 45/48 370/228 |
| 2015/0207724 A1* | 7/2015 | Choudhury | H04L 41/12 370/255 |
| 2015/0281054 A1* | 10/2015 | Utgikar | H04L 49/70 709/221 |
| 2015/0326469 A1* | 11/2015 | Kern | H04L 12/4641 370/254 |
| 2016/0050131 A1* | 2/2016 | Zhang | H04L 43/0811 370/244 |
| 2017/0093641 A1* | 3/2017 | Utgikar | H04L 41/12 |
| 2017/0141963 A1* | 5/2017 | Chalapathy | H04L 41/12 |

FOREIGN PATENT DOCUMENTS

| | | |
|---|---|---|
| CN | 102684915 A | 9/2012 |
| CN | 102780569 A | 11/2012 |
| WO | 2010132884 A1 | 11/2010 |

OTHER PUBLICATIONS

Supplementary European Search Report Application No. EP14854712; dated Oct. 6, 2016; pp. 8.

* cited by examiner

| DA | SA | 802.1Q tag | | | |
|---|---|---|---|---|---|
| MAC of opposite interface | MAC of interface | 0x8100 | 4094 | 0x0800 | IP message |

Manufacturer identifier: Type: 0x8000; Length: Identify the length of name
Equipment type: Type: 0x8001; Length: The length of the type name
MAC of equipment bridge: Type: 0x8002; Length: 6
NEID:   Type: 0x8003; Length: 4
NEIP IPV4: Type: 0x8004; Length: 4
NEIP IPV6: Type: 0x8005; Length: 16

METHOD AND DEVICE FOR CONFIGURING AND MANAGING NETWORK ELEMENT EQUIPMENT, AND NETWORK ELEMENT EQUIPMENT

TECHNICAL FIELD

The present disclosure relates to the field of communication, and in particular to a method and device for configuring and managing network element equipment, and network element equipment.

BACKGROUND

During current network node configuration of an Internet Protocol (IP) Radio Access Network (RAN), node configuration is performed mainly in a manual manner or a semiautomatic manner, and the manual manner refers to manually configuring routing parameters of each node on the network, for example, related parameters of an IP address of a port and a channel of a Data Communication Network (DCN); and in the semiautomatic manner, the IP address of the port, the channel of the DCN and the like of a node directly adjacent to a configuration server or a network management system on the network are manually configured in the manual manner, while for the configuration of each node of other nodes, the IP address of the adjacent node and an IP address of the configuration server are automatically learned through a learning mechanism and a routing mechanism, a configuration channel with the configuration server or the adjacent node of the configuration server is established, and related parameters of an IP address, DCN channel and the like of the other node are configured and managed through the configuration server or the adjacent node of the configuration server.

For discovery and routing advertisement of a routing topology on a network, there mainly exist the following five implementation manners in an Open Shortest Path First (OSPF) routing protocol: a broadcast network, Non-Broadcast Multi-Access (NBMA), a Peer to Peer (P2P) network, a Point 2 Multiple Point (P2MP) master station and a virtual link. A broadcast type interface is mainly adopted at present, it is necessary to select a Designated Router (DR)/Backup Designated Router (BDR) in network element equipment, and the selected DR makes a broadcast notice about routing topology information of the entire network to nodes on the entire network to enable each node to learn the routing topology information of the entire network and automatically create a routing forwarding path; and when an OSPF P2P type interface is set, a Point-to-Point Protocol over Ethernet (PPPoE) is usually adopted to send DCN data without learning a next-hop address.

When such a manual manner or a semiautomatic configuration manner is adopted, it is necessary to manually configure all nodes or a part of nodes on a network, and along with scale enlargement of the network, in particular for an IP RAN with a great number of access nodes, adoption of the manual manner for configuration and management may bring a lot of configuration and management work, so that manual configuration for nodes has the shortcomings of high workload and operation complexity in a related art, which may reduce network performance and cause a poor user experience.

SUMMARY

The present disclosure provides a method and device for configuring and managing network element equipment and network element equipment, so as to at least solve the problem that manual configuration for the nodes has the shortcomings of high workload and operation complexity in the related art to reduce network performance and cause a poor user experience.

According to one aspect of the present disclosure, a method for configuring and managing network element equipment is provided, comprising: generating a management Internet Protocol (IP) address according to network element parameter information; starting an Interior Gateway Protocol (IGP), and creating a network management Virtual Routing Forwarding (VRF) and at least one Peer to Peer (P2P) type port; learning a management IP address of an adjacent network element and a Medium Access Control (MAC) address of the adjacent network element; and receiving network element equipment configuration and management information issued by a network management system.

In an example embodiment of the present disclosure, after receiving the network element equipment configuration and management information issued by the network management system, further comprising: transmitting the network element equipment configuration and management information to all network elements of an entire network.

In an example embodiment of the present disclosure, before receiving the network element equipment configuration and management information issued by the network management system, further comprising: acquiring network element equipment information of all network elements of an entire network.

In an example embodiment of the present disclosure, after acquiring the network element equipment information of all the network elements of the entire network, further comprising: reporting the acquired network element equipment information of all the network elements of the entire network to the network management system.

In an example embodiment of the present disclosure, the network element equipment information of all the network elements of the entire network is acquired in a manner of: acquiring the network element equipment information of all the network elements of the entire network in a manner of advertising to each other between adjacent network elements, wherein the manner of advertising to each other between the adjacent network elements comprises: advertising, by a first network element, network element equipment information of the first network element to a second network element adjacent to the first network element in a manner of sending a protocol message after encapsulating the network element equipment information of the first network element into the protocol message in a Tag Length Value (TLV) manner; advertising, by the second network element, the acquired network element equipment information of the first network element and network element equipment information of the second network element to the first network element and a third network element adjacent to the second network element in a same manner; and performing, by network elements, neighbor advertisement as long as having acquired updated network element equipment information until all the network elements acquire the network element equipment information of all the network elements of the entire network.

In an example embodiment of the present disclosure, the network element parameter information comprises at least one of: the MAC address of a network element, a sequence number of the network element and a network element identifier of the network element.

In an example embodiment of the present disclosure, the network element equipment information comprises at least one of: manufacturer information of a network element, equipment model of the network element, the MAC address of the network element, network element identifier of the network element, Internet Protocol Version 4 (IPV4) information of the network element and Internet Protocol Version 6(IPV6) information of the network element.

In an example embodiment of the present disclosure, learning the management IP address of the adjacent network element and the MAC address of the adjacent network element comprises: learning the management IP address of the adjacent network element and the MAC address of the adjacent network element through Link Layer Discovery Protocol (LLDP) message, wherein management address TLVs in the LLDP message carries the management IP address of the adjacent network element, and source MAC address in the LLDP message carries the MAC address of the adjacent network element; and/or, learning the management IP address of the adjacent network element and the MAC address of the adjacent network element through an IGP routing learning manner and an Address Resolution Protocol (ARP) message manner, wherein the management IP address of the adjacent network element is learned through the IGP routing learning manner, and the MAC address of the adjacent network element is learned in a manner of interacting the ARP message with the adjacent network element.

According to another aspect of the present disclosure, a device for configuring and managing network element equipment is provided, comprising: a generating component, configured to generate a management Internet Protocol (IP) address according to network element parameter information; a creating component, configured to start an Interior Gateway Protocol (IGP), and create a network management Virtual Routing Forwarding (VRF) and at least one Peer to Peer (P2P) type port; a learning component, configured to learn a management IP address of an adjacent network element and a Medium Access Control (MAC) address of the adjacent network element; and a receiving component, configured to receive network element equipment configuration and management information issued by a network management system.

In an example embodiment of the present disclosure, the device further comprising: a transmitting component, configured to transmit the network element equipment configuration and management information to all network elements of an entire network.

In an example embodiment of the present disclosure, the device further comprising: an acquiring component, configured to acquire network element equipment information of all network elements of an entire network.

In an example embodiment of the present disclosure, the device further comprising: a reporting component, configured to report the acquired network element equipment information of all the network elements of the entire network to the network management system.

In an example embodiment of the present disclosure, the device the acquiring component comprises: an acquiring element, configured to acquire the network element equipment information of all the network elements of the entire network in a manner of advertising to each other between adjacent network elements, wherein the manner of advertising to each other between the adjacent network elements comprises that: a first network element advertises network element equipment information of the first network element to a second network element adjacent to the first network element in a manner of sending a protocol message after encapsulating the network element equipment information of the first network element into the protocol message in a Tag Length Value (TLV) manner; the second network element advertises the acquired network element equipment information of the first network element and network element equipment information of the second network element to the first network element and a third network element adjacent to the second network element in a same manner; and network elements perform neighbor advertisement as long as having acquired updated network element equipment information until all the network elements acquire the network element equipment information of all the network elements of the entire network.

In an example embodiment of the present disclosure, the device the learning component comprises: a first learning element, configured to learn the management IP address of the adjacent network element and the MAC address of the adjacent network element through Link Layer Discovery Protocol (LLDP) message, wherein management address TLVs in the LLDP message carries the management IP address of the adjacent network element, and source MAC address in the LLDP message carries the MAC address of the adjacent network element; and/or, a second learning element, configured to learn the management IP address of the adjacent network element and the MAC address of the adjacent network element through an IGP routing learning manner and an Address Resolution Protocol (ARP) message, wherein the management IP address of the adjacent network element is learned through the IGP routing learning manner, and the MAC address of the adjacent network element is learned in a manner of interacting the ARP message with the adjacent network element.

According to another aspect of the present disclosure, network element equipment is provided, which may include the device in any one of the abovementioned items.

According to the present disclosure, a management IP address is generated according to network element parameter information; an IGP is started, a network management VRF and at least one P2P type port are created; a management IP address of an adjacent network element and an MAC address of the adjacent network element are learned; and the network element equipment configuration and management information issued by the network management system is received, so that the problem that manual configuration of the nodes has the shortcomings of high workload and operation complexity in the related art to reduce network performance and cause a poor user experience is solved, and the effect of implementing plug-and-manage of the network element equipment without manually configuring the network element equipment is further achieved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Figure 1:
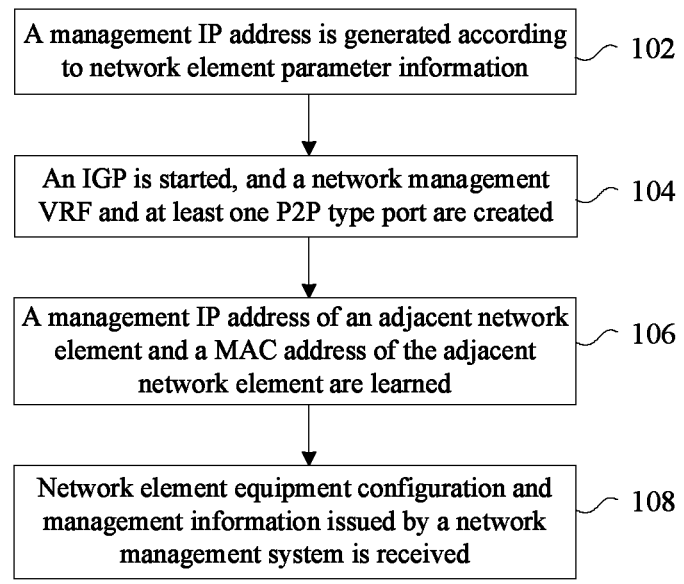
FIG. 1 is a flowchart of a method for configuring and managing network element equipment according to an embodiment of the present disclosure.

The embodiment provides a method for configuring and managing network element equipment. FIG. 1 is a flowchart of the method for configuring and managing the network element equipment according to an embodiment of the present disclosure, and as shown in FIG. 1, the flow includes the following steps:

Step 102: a management IP address is generated according to network element parameter information, wherein the network element parameter information may include at least one of: an MAC address of a network element, a sequence number of the network element and NEID of the network element;

Step 104: an IGP is started, and a network management VRF and at least one P2P type port are created;

Step 106: a management IP address of an adjacent network element and a MAC address of the adjacent network element are learned; and Step 108: network element equipment configuration and management information issued by a network management system is received.

By the steps, network element equipment generates the management IP address, creates the VRF and the at least one P2P type port, learns the management IP address and the MAC address, thereby receiving the network element equipment configuration and management information issued by the network management system; and therefore, the problem that manual configuration of nodes has the shortcomings of high workload and operation complexity in the related art and cause reducing network performance and a poor user experience is solved, the effects of implementing plug-and-manage of the network element equipment without manually configuring the network element equipment, effectively improving network performance and greatly enhancing the user experience are further achieved.

After the step that the network element equipment configuration and management information issued by the network management system is received, it is necessary to transmit the network element equipment configuration and management information among the network elements, that is, the network element equipment configuration and management information is transmitted to all network elements of the entire network to enable all the network elements of the entire network acquire configuration and management of the network management system over the network element equipment.

It is important to note that network element equipment information of all the network elements of the entire network is acquired according to a corresponding architecture created by the management IP address before the network element equipment configuration and management information issued by the network management system is received. Wherein, there may also be multiple kinds of network element equipment information, which may, for example, include at least one of: manufacturer information of the network element, equipment model of the network element, the MAC address of the network element, the NEID of the network element, IPV4 information of the network element and IPV6 information of the network element. Wherein, multiple acquisition manners may be adopted, and for example, the network element equipment information of all the network elements of the entire network may be acquired in a manner as follows: the network element equipment information of all the network elements of the entire network is acquired in a manner of advertising to each other between adjacent network elements, wherein the manner of advertising to each other between the adjacent network elements may include that: a first network element advertises network element equipment information of the first network element to a second network element adjacent to the first network element in a manner of sending a protocol message after encapsulating the network element equipment information of the first network element into the protocol message in a TLV manner; the second network element advertises the acquired network element equipment information of the first network element and network element equipment information of the second network element to the first network element and a third network element adjacent to the second network element in a same manner; and the network elements perform neighbor advertisement as long as having acquired updated network element equipment information until all the network elements acquire the network element equipment information of all the network elements of the entire network. So far, all the network elements of the entire network have acquired the network element equipment information of all the network elements of the entire network.

In an example embodiment, after the network element equipment information of all the network elements of the entire network is acquired, the acquired network element equipment information of all the network elements of the entire network may further be reported to the network management system, that is, the network element equipment information of all the network elements of the entire network is reported to the network management system through aggregation equipment with an aggregation function.

Wherein, multiple manners may also be adopted for learning the management IP address of the adjacent network element and MAC address of the adjacent network element, and two preferred manners will be enumerated below. Manner 1: the management IP address of the adjacent network element and the MAC address of the adjacent network element are learned through LLDP message, wherein management address TLVs in the LLDP message carries the management IP address of the adjacent network element, and source MAC address in the LLDP message carries the MAC address of the adjacent network element; and Manner 2: the management IP address of the adjacent network element and the MAC address of the adjacent network element are learned through an IGP routing learning manner and an ARP message manner, wherein the management IP address of the adjacent network element is learned through the IGP routing learning manner, and the MAC address of the adjacent network element is learned in a manner of interacting the ARP message with the adjacent network element. It is important to point out that the abovementioned two manners may also be correspondingly combined according to a specific scenario requirement.

The embodiment further provides a device for configuring and managing network element equipment, which is configured to implement the abovementioned embodiment and example implementation mode, and that what has been described will not be elaborated. For example, term "component", used below, is a combination of software and/or hardware capable of realizing a preset function. The device described in the following embodiment is preferably implemented by software, but implementation of the device with hardware or the combination of software and hardware is also possible and conceived.

Figure 2:
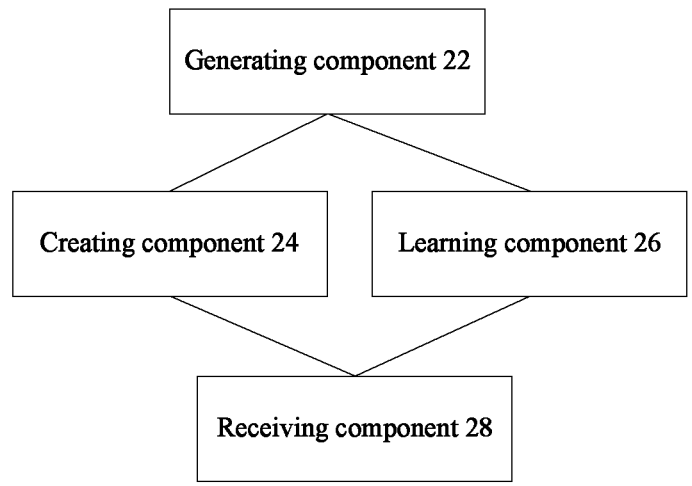
FIG. 2 is a structure diagram of a device for configuring and managing network element equipment according to an embodiment of the present disclosure.

FIG. 2 is a structure diagram of a device for configuring and managing network element equipment according to an embodiment of the present disclosure, and as shown in FIG. 2, the device includes a generating component 22, a creating component 24, a learning component 26 and a receiving component 28. The device will be described below.

The generating component 22 is configured to generate a management IP address according to network element parameter information; the creating component 24 is configured to start an IGP, and create a network management VRF and at least one P2P type port; the learning component 26 is connected to the generating component 22, and is configured to learn a management IP address of an adjacent network element and an MAC address of the adjacent network element; and the receiving component 28 is connected to the creating component 24 and the learning component 26, and is configured to receive network element equipment configuration and management information issued by a network management system.

Figure 3:
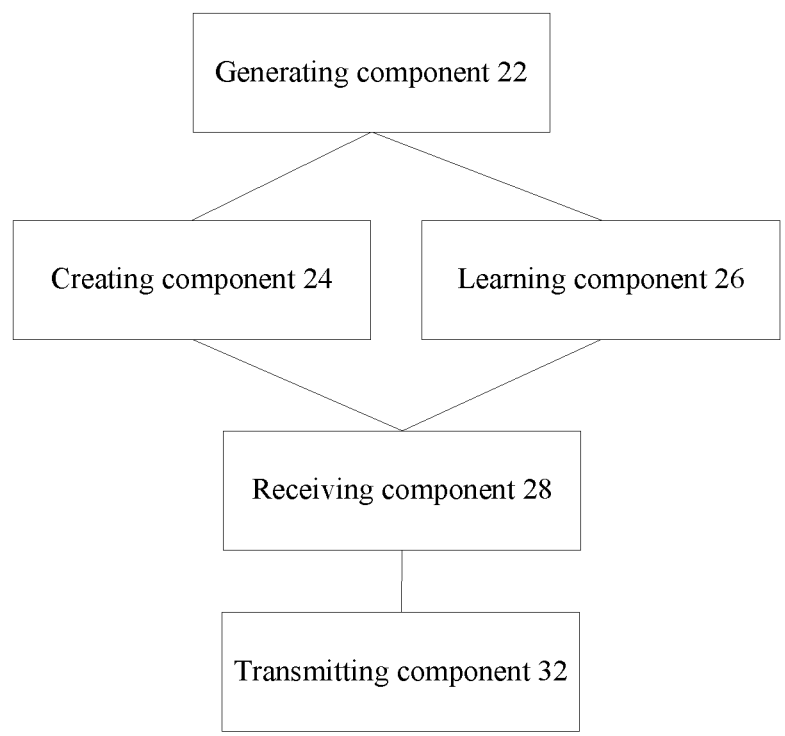
FIG. 3 is a first example structure diagram of the device for configuring and managing the network element equipment according to an embodiment of the present disclosure.

FIG. 3 is a first example structure diagram of the device for configuring and managing the network element equipment according to an embodiment of the present disclosure, and as shown in FIG. 3, the device further, besides all the components shown in FIG. 2, includes: a transmitting component 32. The transmitting component 32 will be described below.

The transmitting component 32 is connected to the receiving component 28, and is configured to transmit the network element equipment configuration and management information to all network elements of an entire network.

Figure 4:
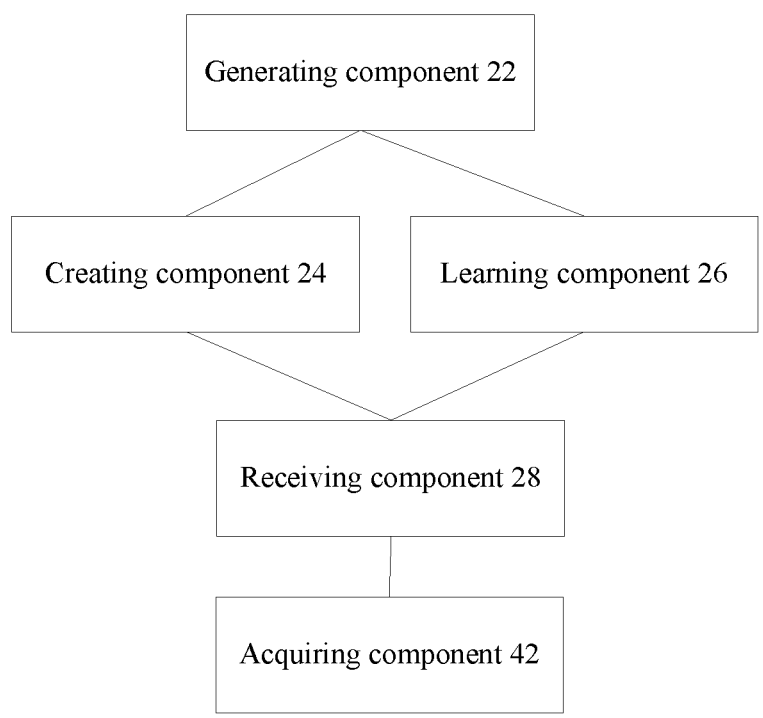
FIG. 4 is a second example structure diagram of the device for configuring and managing the network element equipment according to an embodiment of the present disclosure.

FIG. 4 is a second example structure diagram of the device for configuring and managing the network element equipment according to an embodiment of the present disclosure, and as shown in FIG. 4, the device further, besides all the components shown in FIG. 2, includes: an acquiring component 42. The acquiring component 42 will be described below.

The acquiring component 42 is connected to the receiving component 28, and is configured to acquire network element equipment information of all the network elements of an entire network.

Figure 5:
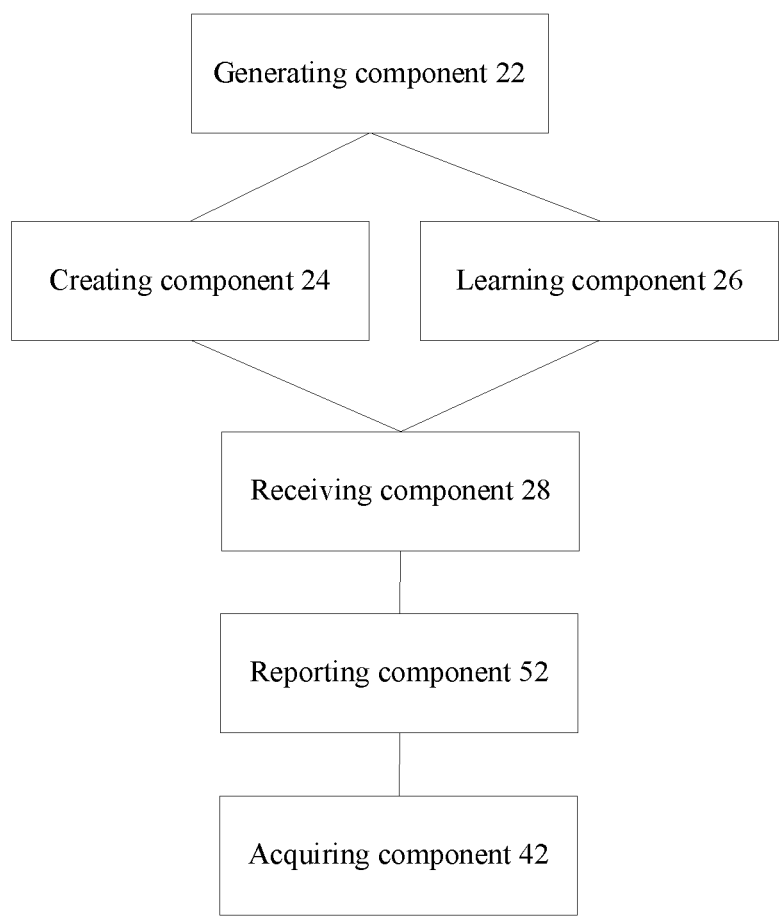
FIG. 5 is a third example structure diagram of the device for configuring and managing the network element equipment according to an embodiment of the present disclosure.

FIG. 5 is a third example structure diagram of the device for configuring and managing the network element equipment according to an embodiment of the present disclosure, and as shown in FIG. 5, the device further, besides all the components shown in FIG. 4, includes: a reporting component 52. The reporting component 52 will be described below.

The reporting component 52 is connected to the acquiring component 42 and the receiving component 28, and is configured to report the acquired network element equipment information of all the network elements of the entire network to the network management system.

Figure 6:
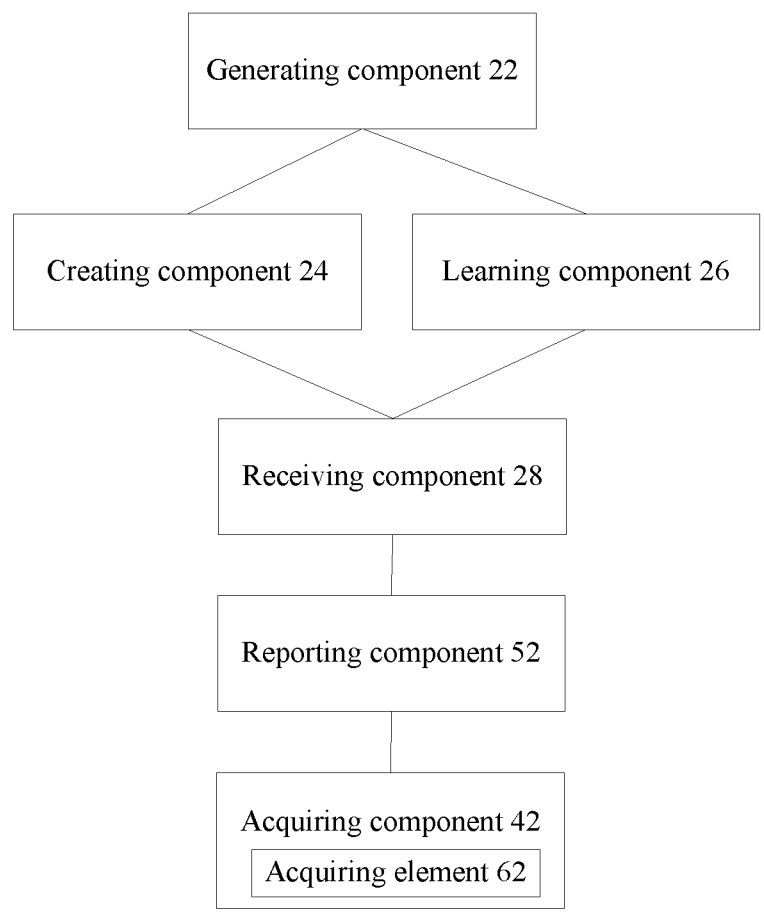
FIG. 6 is an example structure diagram of the acquiring component 42 in the device for configuring and managing the network element equipment according to an embodiment of the present disclosure.

FIG. 6 is an example structure diagram of the acquiring component 42 in the device for configuring and managing the network element equipment according to an embodiment of the present disclosure, and as shown in FIG. 6, the acquiring component 42 includes an acquiring element 62. The acquiring element 62 will be described below.

The acquiring element 62 is configured to acquire the network element equipment information of all the network elements of the entire network in a manner of advertising to each other between adjacent network elements, wherein the manner of advertising to each other between the adjacent network elements may include that: a first network element advertises network element equipment information of the first network element to a second network element adjacent to the first network element in a manner of sending a protocol message after encapsulating the network element equipment information of the first network element into the protocol message in a TLV manner, the second network element advertises the acquired network element equipment information of the first network element and network element equipment information of the second network element to the first network element and a third network element adjacent to the second network element in a same manner; and the network elements perform neighbor advertisement as long as having acquired updated network element equipment information until all the network elements acquire the network element equipment information of all the network elements of the entire network.

Figure 7:
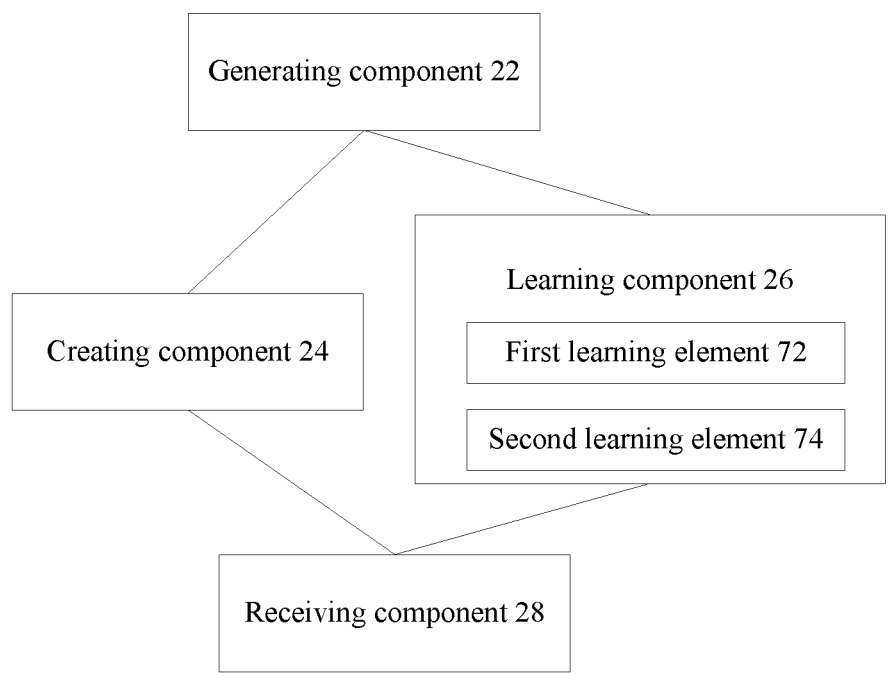
FIG. 7 is an example structure diagram of the learning component 24 in the device for configuring and managing the network element equipment according to an embodiment of the present disclosure.

FIG. 7 is an example structure diagram of the learning component 24 in the device for configuring and managing the network element equipment according to an embodiment of the present disclosure, and as shown in FIG. 7, the learning component 26 includes a first learning element 72 and a second learning element 74. The learning component 26 will be described below.

The first learning element 72 is configured to learn the management IP address of the adjacent network element and the MAC address of the adjacent network element through LLDP message, wherein management address TLVs in the LLDP message may carries the management IP address of the adjacent network element, and source MAC address in the LLDP message may carries the MAC address of the adjacent network element; and the second learning element 74 is configured to learn the management IP address of the adjacent network element and the MAC address of the adjacent network element through an IGP routing learning manner and an ARP message manner, wherein the management IP address of the adjacent network element may be learned through the IGP routing learning manner, and the MAC address of the adjacent network element may be learned in a manner of interacting the ARP message with the adjacent network element.

Figure 8:
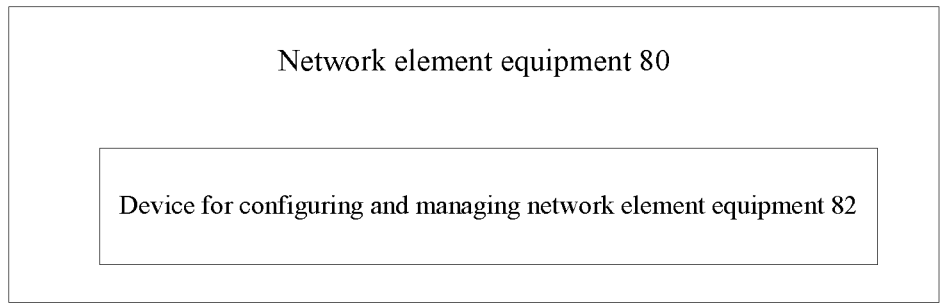
FIG. 8 is a structure diagram of network element equipment according to an embodiment of the present disclosure.

The embodiment further provides network element equipment. FIG. 8 is a structure diagram of network element equipment according to an embodiment of the present disclosure, and as shown in FIG. 8, the network element equipment 80 includes the the device for configuring and managing the network element equipment 82 in any abovementioned item.

Figure 9:
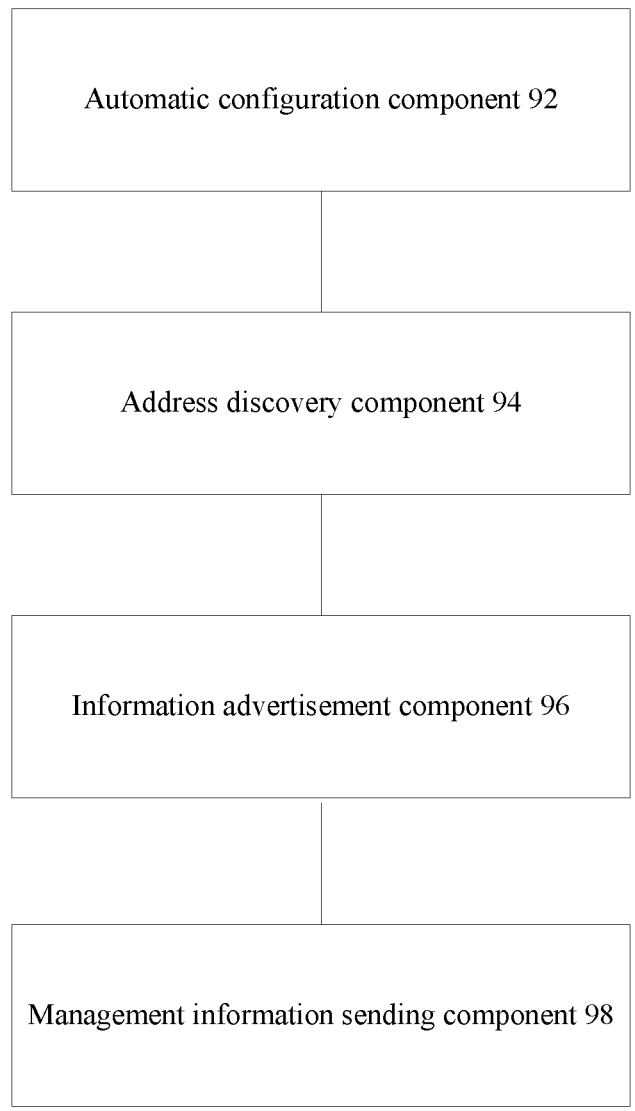
FIG. 9 is a structure diagram of a system according to an embodiment of the present disclosure.

For the problem that high workload and operation complexity of manual configuration of nodes reduces network performance and causes a poor user experience in the related art, i.e. the problem that there are many access nodes in a current IP RAN and a lot of configuration and management work is required, for example, IP address configuration of each port on the nodes. The embodiment provides a node processing manner for configuration-free plug-and-manage in an IP RAN scenario to implement management and configuration of IP RAN access equipment. For example, the following processing may be adopted: each node automatically generates a whole-network management IP address (Loopback address) through a specific algorithm or rule, then starts a routing protocol process, for example, an OSPF protocol, to automatically create DCN VRF and implements network element information and routing information advertisement in a manner of extending a related protocol to implements DCN self-communication of network elements to realize a plug-and-manage function. A system applied to the solution will be briefly described below. FIG. 9 is a structure diagram of a system according to an embodiment of the present disclosure, and as shown in FIG. 9, the system mainly includes the following four component: an automatic configuration component 92 (equivalent to the abovementioned generating component 22 in function), an address discovery component 94 (equivalent to the abovementioned learning component 26 in function), an information advertisement component 96 (equivalent to the transmitting component 32 in function) and a management information sending component 98 (equivalent to the abovementioned receiving component 28 in function). The system will be described below.

The automatic configuration component 92: the component is mainly configured to automatically generate one management IP address as a loopback management IP address of a node according to information such as a bridge MAC address, sequence numbers and an NEID of each node, automatically start the routing protocol process and create network management VRF and a DCN P2P2 sub-interface;

the address discovery component 94: the component mainly runs an IGP, for example, the OSPF protocol, on the DCN P2P sub-interface to learn and discover the management IP address of the next hop, and triggers an ARP to learn and discover the MAC address of the corresponding port of the next hop when there exists DCN management information data required to be transmitted;

the information advertisement component 96: the component mainly advertises related network element information of the equipment node of the network, for example: network element information including manufacturer information of a network element, a equipment model of the network element, an MAC address of the network element, an NEID of the network element, Internet Protocol version 4 (NEIPV4) information of the network element and Internet Protocol version 6 (NEIPV6) information of the network element, to adjacent nodes of the network by extending a related protocol, for example, an OSPF TYPE 10 Link State Advertisements (OSPF TYPE 10 LSA) protocol or an LLDP, and then aggregation equipment on the IP RAN collects network element information of all the nodes on the network, and sends the network element information to a network management system in a unified manner for the network management system to register and manage new equipment; and the management information sending component 98: after DCN channels of the nodes are enabled, the network management system transmit and send the management and configuration data information, which is planned in the unified manner, of each node on the network.

Figures 10, 11:
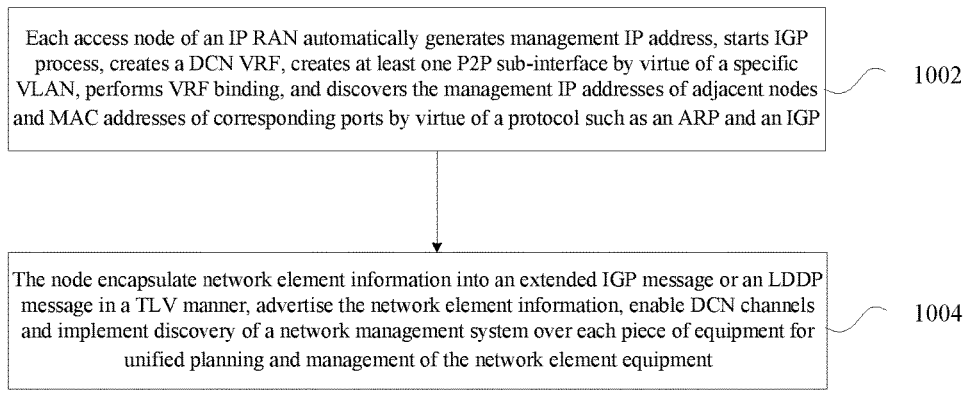
FIG. 10 is a flowchart of a deployment-free plug-and-manage method for an IP RAN according to an embodiment of the present disclosure.
FIG. 11 is a diagram of an encapsulation format of a DCN management message according to an embodiment of the present disclosure.

Based on the configuration-free plug-and-manage system for the IP RAN, the embodiment further provides an implementation method for configuration-free plug-and-manage of an IP RAN. FIG. 10 is a flowchart of a deployment-free plug-and-manage method for an IP RAN according to an embodiment of the present disclosure, and as shown in FIG. 10, the flow includes the following steps:

Step 1002: each access node of the IP RAN automatically generates an management IP address, starts an IGP process, creates a DCN VRF, creates a P2P sub-interfaces by virtue of a specific Virtual Local Area Network (VLAN) (4094), performs VRF binding; and discovers the management IP addresses of adjacent nodes and MAC addresses of corresponding ports by virtue of a protocol such as an ARP and an IGP; and Step 1004: the nodes encapsulate network element information into an extended IGP message or an LDDP message in a TLV manner, to advertise the network element information, enable DCN channels and implement discovery of a network management system over each piece of equipment for unified planning and management on the network element equipment.

Processing in each abovementioned step is described below respectively.

Figure 12:
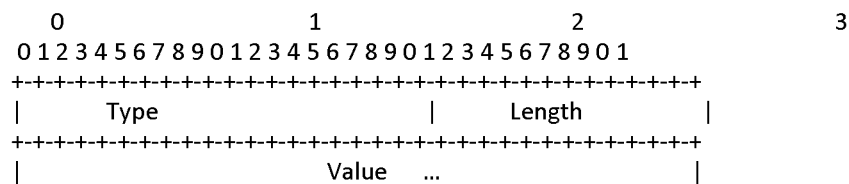
FIG. 12 is a diagram of an encapsulation format of network element information TLV according to an embodiment of the present disclosure.
Figure 13:
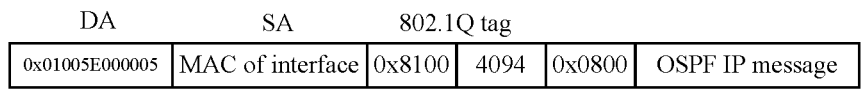
FIG. 13 is a diagram of a format of an OSPF P2P flooding multicast message according to an embodiment of the present disclosure.

1: each node automatically generates an management IP address according to information of a bridge MAC address of the node, a sequence number of the node, an NEID of the node and the like for the configuration of the management IP address (Loopback) of the node; automatically starts the IGP process, for example: an OSPF protocol process, creates a DCN VRF and at least one specific VLAN (4094) DCN P2P sub-interface, performs binding and utilizes the Loopback IP address of the present node;

2: the management IP address of the next hop, i.e. IP address of directly adjacent opposite node, may be learned according to a table for calculating the IP routing of the DCN, then the ARP is started to send an ARP request message to the adjacent opposite node on the DCN P2P sub-interface under the triggering of DCN management data transmission, the opposite node sends an ARP response message containing the MAC address of the opposite port, and in such a manner, the MAC address of the opposite port is learned, and the learned MAC address is used as destination MAC address of subsequent management message; FIG. 11 is a diagram of an encapsulation format of a DCN management message according to an embodiment of the present disclosure, as shown in FIG. 11;

3: the node encapsulates related network element information of the node, for example: manufacturer information, equipment model, an MAC address of network element, an NEID of the network element, NEIPV4 and NEIPV6, into extended OSPF LSA message or LLDP message in the TLV manner for advertisement to other node of the network by extending a related protocol, for example: an OSPF protocol or an LLDP; FIG. 12 is a diagram of a TLV encapsulation format of network element information according to an embodiment of the present disclosure, and the format of the TLV message is shown in FIG. 12; when an OSPF manner is adopted, a multicast (224.0.0.5) manner is adopted for advertisement to other nodes, FIG. 13 is a diagram of a format of an OSPF P2P flooding multicast message according to an embodiment of the present disclosure, and the format of flooding multicast message is shown in FIG. 13; and 4: the node on the network learns network element information of all node equipment of the network, then aggregation equipment on the IP RAN reports the network element information to the network management system in a unified manner, and the network management system manages and plans the equipment in the unified manner, transmits the corresponding management IP address and parameter configuration, and pushes services.

By the abovementioned system and method, the nodes automatically configure the management IP addresses to realize a plug-and-manage function without manually configuring the equipment on the network.

An example implementation mode of the present disclosure will be described below with reference to the drawings.

Figure 14:
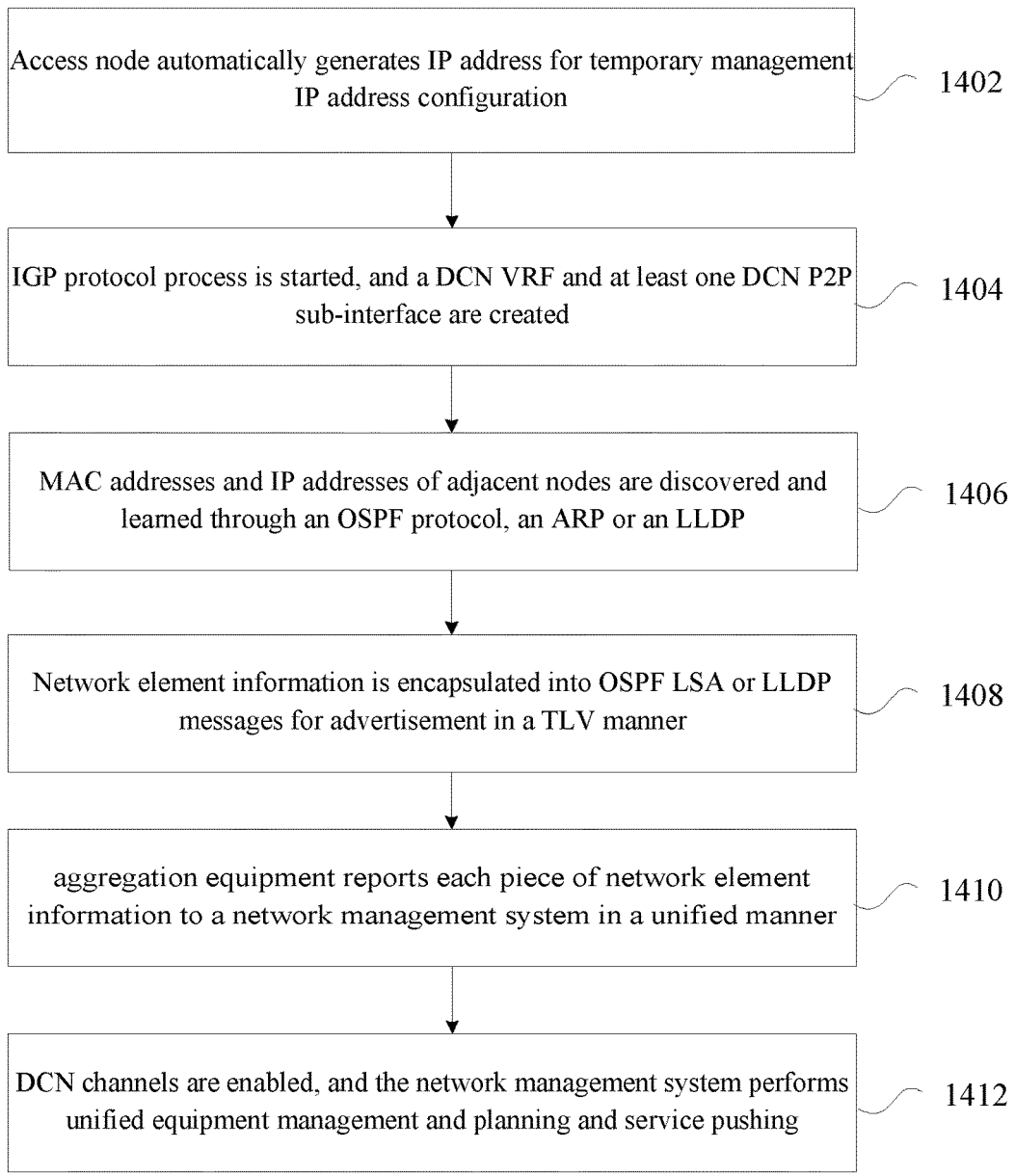
FIG. 14 is a flowchart of configuration-free plug-and-manage for an IP RAN according to a preferred implementation mode of the present disclosure.

FIG. 14 is a flowchart of configuration-free plug-and-manage for an IP RAN according to an example implementation mode of the present disclosure, and as shown in FIG. 14, the flow includes the following steps:

Step 1402: access node automatically generates IP address for management IP address configuration;

Step 1404: IGP protocol processes are started, and a DCN VRF and at least one DCN P2P sub-interface are created;

Step 1406: MAC addresses and IP addresses of adjacent nodes are discovered and learned through an OSPF protocol, an ARP or an LLDP;

Step 1408: network element information is encapsulated into OSPF LSA or LLDP messages for advertisement in a TLV manner;

Step 1410: aggregation equipment reports each piece of network element information to a network management system in a unified manner; and Step 1412: DCN channels are enabled, and the network management system performs unified equipment management and planning and service pushing.

Figure 15:
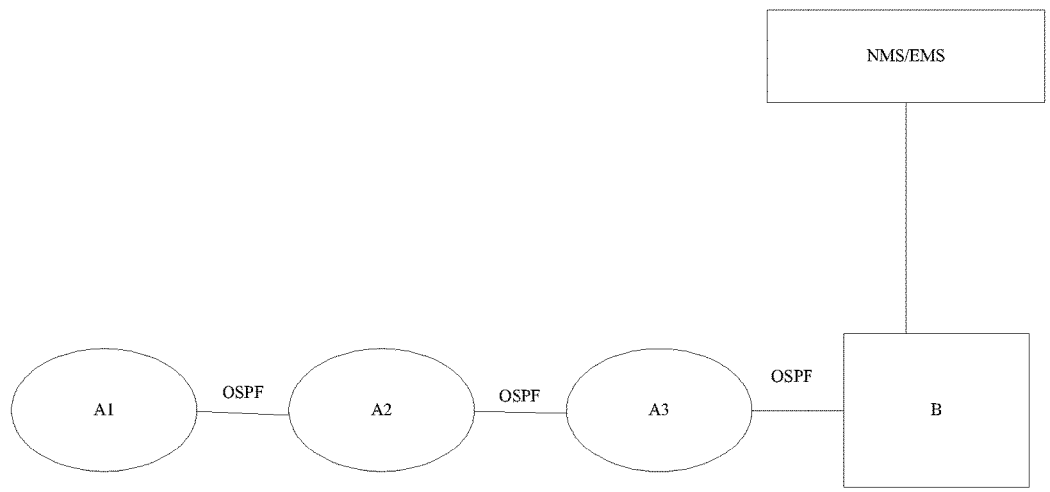
FIG. 15 is a diagram of a configuration-free plug-and-manage network structure for an IP RAN according to a preferred implementation mode of the present disclosure.

FIG. 15 is a diagram of a configuration-free plug-and-manage network structure for an IP RAN according to an example implementation mode of the present disclosure, and a configuration-free plug-and-manage processing flow for the IP RAN in the example implementation mode will be described below with reference to FIG. 15, that is, how to realize a plug-and-manage function by extending the OSPF protocol when new equipment accesses the network will be briefly described with the network structure shown in FIG. 15 as an example.

1: when being powered on, any access node A1 or A2 or A3 in FIG. 15 automatically generates a management IP address according to a specific rule or algorithm, for example: an bridge MAC address of the node, an ID of the node and an allocated sequence number of the node, to perform configuration on the management (Loopback) IP address of the present node, or management (Loopback) IP addresses are configured to each node in manual manner;

2: each of nodes A1, A2 and A3 starts OSPF protocol processes and the like after the management IP addresses are configured, automatically creates DCN VRF, creates sub-interfaces on a DCN enabling interface by virtue of a specific VLAN (4094), the sub-interfaces adopting a P2P (unnumbered interface) type, binds the DCN VRF, and borrows the Loopback IP address;

3: for learning and discovery corresponding port MAC addresses and own management IP addresses between A1 and A2, between A2 and A3 and between A3 and B, an LLDP manner is adopted under a default condition, but an OSPF manner, an ARP manner and the like may also be adopted for learning of the IP addresses and MAC addresses of the opposite ports;

4: when the LLDP manner is adopted, for example, node A2 in FIG. 15 contains the management IP address of A2, i.e. the NEIP of the opposite network element, through a Management Address TLV in an LLDP message sent to the adjacent nodes A1 and A3, to distinguish IPV4 (Mandatory) and IPV6 (optional) for the adjacent nodes A1 and A3 to discover and learn management (Loopback) IP address information of A2 according to a management Address Subtype in the message; in addition, the MAC address of the opposite port is learned by virtue of source MAC address information in the LLDP message; as shown in FIG. 15, A1 and A3 learn MAC addresses of the corresponding ports of A2 by virtue of the source MAC address information on a header of the LLDP message, i.e. the MAC address of the opposite port on A2; an IP-MAC binding relationship is contained in the LLDP message;

5: when the OSPF and ARP manners are adopted, for example, when node A2 in FIG. 15 adopts an OSPF P2P type for DCN routing learning, the adjacent nodes A1 and A3 may learn the management IP address information of node A2, and when nodes A1 and A3 have DCN management data to be sent, the ARP is started on their DCN sub-interfaces, ARP Request messages are sent to the corresponding ports on A2, and then the corresponding ports of A2 send corresponding ARP Reply messages to implement learning of the MAC address information on the corresponding ports;

6: A1, A2 and A3 perform negotiation and routing discovery and calculation to form DCN IP routing tables by virtue of a standard OSPF protocol;

7: network element information, for example: information of manufacturer, equipment model, MAC address of the network element, NEID, NEIPV4 and NEIPV6, is encapsulated into OSPF TYPE 10 LSA protocol messages and the like in a TLV manner, and the information is flooded in a multicast (224.0.0.5) manner; for example, node A1 in FIG. 15 advertises network element information of A1 to the adjacent node A2 in the multicast manner (224.0.0.5); while A2 advertises the learned network element information of A1 and network element information of A2 to the adjacent nodes A3 and A1 in the multicast manner after learning the network element information of node A1 node A3 also advertises the learned network element information of A1 and A2 and network element information of node A3 to the adjacent nodes A2 and B in the same manner; A1, A2, A3 and B finally all learn the network element information of the nodes of the entire network;

8: the unified aggregation equipment B reports all the network element equipment information of A1, A2, A3 and B to a network management system in a unified manner to realize the plug-and-manage function; and 9: after DCN channels are enabled, the network management system performs unified management and planning and service pushing on A1, A2, A3 and B to implement network element equipment configuration and management.

Obviously, those skilled in the art should know that each component or step of the present disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, and the shown or described steps may be executed in a sequence different from that shown here under certain circumstances, or the components or steps may form each integrated circuit component respectively, or multiple components or steps therein can form a single integrated circuit component for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

As mentioned above, by the embodiment and preferred implementation mode of the present disclosure, plug-and-manage of network element equipment is implemented without manually configuring the network element equipment.

What is claimed is:

1. A method for configuring and managing network element equipment, comprising:
   generating a management Internet Protocol (IP) address according to network element parameter information;
   starting an Interior Gateway Protocol (IGP), and creating a network management Virtual Routing Forwarding (VRF) and at least one Peer to Peer (P2P) type port;
   learning a management IP address of an adjacent network element and a Medium Access Control (MAC) address of the adjacent network element; and
   receiving network element equipment configuration and management information issued by a network management system.

2. The method as claimed in claim 1, after receiving the network element equipment configuration and management information issued by the network management system, further comprising:
   transmitting the network element equipment configuration and management information to all network elements of an entire network.

3. The method as claimed in claim 1, before receiving the network element equipment configuration and management information issued by the network management system, further comprising:
   acquiring network element equipment information of all network elements of an entire network.

4. The method as claimed in claim 3, after acquiring the network element equipment information of all the network elements of the entire network, further comprising:
   reporting the acquired network element equipment information of all the network elements of the entire network to the network management system.

5. The method as claimed in claim 3, wherein the network element equipment information of all the network elements of the entire network is acquired in a manner of:
   acquiring the network element equipment information of all the network elements of the entire network in a manner of advertising to each other between adjacent network elements, wherein the manner of advertising to each other between the adjacent network elements comprises: advertising, by a first network element, network element equipment information of the first network element to a second network element adjacent to the first network element in a manner of sending a protocol message after encapsulating the network element equipment information of the first network element into the protocol message in a Tag Length Value (TLV) manner; advertising, by the second network element, the acquired network element equipment information of the first network element and network element equipment information of the second network element to the first network element and a third network element adjacent to the second network element in a same manner; and performing, by network elements, neighbor advertisement as long as having acquired updated network element equipment information until all the network elements acquire the network element equipment information of all the network elements of the entire network.

6. The method as claimed in claim 1, wherein the network element parameter information comprises at least one of:
   the MAC address of a network element, a sequence number of the network element and a network element identifier of the network element.

7. The method as claimed in claim 3, wherein the network element equipment information comprises at least one of:
   manufacturer information of a network element, equipment model of the network element, the MAC address of the network element, network element identifier of the network element, Internet Protocol Version 4 (IPV4) information of the network element and Internet Protocol Version 6 (IPV6) information of the network element.

8. The method as claimed in claim 1, wherein learning the management IP address of the adjacent network element and the MAC address of the adjacent network element comprises:
   learning the management IP address of the adjacent network element and the MAC address of the adjacent network element through Link Layer Discovery Protocol (LLDP) message, wherein management address TLVs in the LLDP message carries the management IP address of the adjacent network element, and source MAC address in the LLDP message carries the MAC address of the adjacent network element; and/or,
   learning the management IP address of the adjacent network element and the MAC address of the adjacent network element through an IGP routing learning manner and an Address Resolution Protocol (ARP) message manner, wherein the management IP address of the adjacent network element is learned through the IGP routing learning manner, and the MAC address of the adjacent network element is learned in a manner of interacting the ARP message with the adjacent network element.

9. A device for configuring and managing network element equipment, comprising:
a generating component, configured to generate a management Internet Protocol (IP) address according to network element parameter information;
a creating component, configured to start an Interior Gateway Protocol (IGP), and create a network management Virtual Routing Forwarding (VRF) and at least one Peer to Peer (P2P) type port;
a learning component, configured to learn a management IP address of an adjacent network element and a Medium Access Control (MAC) address of the adjacent network element; and
a receiving component, configured to receive network element equipment configuration and management information issued by a network management system.

10. The device as claimed in claim 9, further comprising:
a transmitting component, configured to transmit the network element equipment configuration and management information to all network elements of an entire network.

11. The device as claimed in claim 9, further comprising:
an acquiring component, configured to acquire network element equipment information of all network elements of an entire network.

12. The device as claimed in claim 11, further comprising:
a reporting component, configured to report the acquired network element equipment information of all the network elements of the entire network to the network management system.

13. The device as claimed in claim 11, wherein the acquiring component comprises:
an acquiring element, configured to acquire the network element equipment information of all the network elements of the entire network in a manner of advertising to each other between adjacent network elements, wherein the manner of advertising to each other between the adjacent network elements comprises that: a first network element advertises network element equipment information of the first network element to a second network element adjacent to the first network element in a manner of sending a protocol message after encapsulating the network element equipment information of the first network element into the protocol message in a Tag Length Value (TLV) manner; the second network element advertises the acquired network element equipment information of the first network element and network element equipment information of the second network element to the first network element and a third network element adjacent to the second network element in a same manner; and network elements perform neighbor advertisement as long as having acquired updated network element equipment information until all the network elements acquire the network element equipment information of all the network elements of the entire network.

14. The device as claimed in claim 9, wherein the learning component comprises:
a first learning element, configured to learn the management IP address of the adjacent network element and the MAC address of the adjacent network element through Link Layer Discovery Protocol (LLDP) message, wherein management address TLVs in the LLDP message carries the management IP address of the adjacent network element, and source MAC address in the LLDP message carries the MAC address of the adjacent network element; and/or,
a second learning element, configured to learn the management IP address of the adjacent network element and the MAC address of the adjacent network element through an IGP routing learning manner and an Address Resolution Protocol (ARP) message, wherein the management IP address of the adjacent network element is learned through the IGP routing learning manner, and the MAC address of the adjacent network element is learned in a manner of interacting the ARP message with the adjacent network element.

15. Network element equipment, comprising the device as claimed in claim 9.

* * * * *